US008663372B2

(12) United States Patent
Romdhane et al.

(10) Patent No.: US 8,663,372 B2
(45) Date of Patent: Mar. 4, 2014

(54) MICROPOROUS MEMBRANE AND METHOD FOR FORMING

(71) Applicant: 3M Innovative Properties Company, St. Paul, MN (US)

(72) Inventors: Ilyess H. Romdhane, Woodbury, MN (US); Mikhail S. Mezhirov, Newton, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/974,121

(22) Filed: Aug. 23, 2013

(65) Prior Publication Data

US 2013/0334123 A1 Dec. 19, 2013

Related U.S. Application Data

(62) Division of application No. 13/129,145, filed as application No. PCT/US2009/061572 on Oct. 22, 2009, now Pat. No. 8,540,801.

(60) Provisional application No. 61/116,841, filed on Nov. 21, 2008.

(51) Int. Cl.
*B01D 53/22* (2006.01)
(52) U.S. Cl.
USPC .................. 96/11; 95/43; 95/45; 95/51; 96/7; 96/12
(58) Field of Classification Search
USPC .............................. 95/43, 45, 51; 96/7, 11, 12
See application file for complete search history.

(56) References Cited

U.S. PATENT DOCUMENTS

| | | | |
|---|---|---|---|
| 3,258,414 A | 6/1966 | Gregor et al. |
| 4,340,480 A | 7/1982 | Pall et al. |
| 4,629,563 A | 12/1986 | Wrasidlo |
| 4,774,039 A | 9/1988 | Wrasidlo |
| 4,857,080 A | 8/1989 | Baker et al. |
| 4,877,533 A | 10/1989 | Meldrum et al. |
| 4,992,221 A | 2/1991 | Malon et al. |
| 5,264,012 A | 11/1993 | Clough et al. |
| 5,476,665 A | 12/1995 | Dennison |
| 5,510,421 A | 4/1996 | Dennison et al. |
| 5,869,174 A | 2/1999 | Wang |
| 6,413,070 B1 | 7/2002 | Meyering et al. |

(Continued)

FOREIGN PATENT DOCUMENTS

| | | |
|---|---|---|
| EP | 0 005 536 A2 | 11/1979 |
| JP | 2002-058971 | 2/2002 |

(Continued)

OTHER PUBLICATIONS

Caquineau et al., "Influence of the Relative Humidity on Film Formation by Vapor Induced Phase Separation", *Polymer Engineering and Science*, vol. 43, No. 4, Apr. 2003, pp. 798-808.

(Continued)

*Primary Examiner* — Jason M Greene
*Assistant Examiner* — Anthony Shumate
(74) *Attorney, Agent, or Firm* — Adrian L. Pishko

(57) ABSTRACT

The present disclosure describes a method for forming microporous membranes. More specifically, vapor induced phase separation techniques are used for forming multizone microporous membranes having improved material throughput.

12 Claims, 5 Drawing Sheets

(56) References Cited

U.S. PATENT DOCUMENTS

| | | |
|---|---|---|
| 6,596,167 B2 | 7/2003 | Ji et al. |
| 6,632,850 B2 | 10/2003 | Hughes et al. |
| 6,706,184 B2 * | 3/2004 | Sale et al. ............... 210/500.27 |
| 6,736,971 B2 | 5/2004 | Sale et al. |
| 6,878,419 B2 | 4/2005 | David et al. |
| 6,994,789 B2 | 2/2006 | Sale et al. |
| 7,125,603 B2 | 10/2006 | David et al. |
| 7,585,356 B2 | 9/2009 | Oyama et al. |
| 7,842,214 B2 * | 11/2010 | Romdhane et al. ...... 264/177.14 |
| 8,137,436 B2 | 3/2012 | Calis et al. |
| 8,225,941 B2 * | 7/2012 | Ogawa et al. ........... 210/500.23 |
| 8,366,811 B2 | 2/2013 | Ophir et al. |
| 2002/0162792 A1 | 11/2002 | Zepf |
| 2003/0209485 A1 | 11/2003 | Kools |
| 2003/0217965 A1 | 11/2003 | Kools |
| 2004/0084364 A1 | 5/2004 | Kools |
| 2006/0076288 A1 | 4/2006 | Mezhirov et al. |
| 2006/0196830 A1 | 9/2006 | Sale et al. |
| 2007/0187319 A1 | 8/2007 | Kools et al. |
| 2008/0241503 A1 | 10/2008 | Romdhane et al. |
| 2010/0261801 A1 | 10/2010 | Weiss et al. |
| 2011/0266223 A1 * | 11/2011 | Yang et al. .................... 210/651 |
| 2011/0297612 A1 * | 12/2011 | Hester et al. ............ 210/500.21 |

FOREIGN PATENT DOCUMENTS

| | | |
|---|---|---|
| JP | 2004-025067 | 1/2004 |
| JP | 2005-506168 | 3/2005 |
| JP | 2010522807 | 7/2010 |

OTHER PUBLICATIONS

Khare et al., "Vapor-induced phase separation—effect of the humid air exposure step on membrane morphology Part I. Insights from mathematical modeling", Journal of Membrane Science, 258 (2005), pp. 140-156).

* cited by examiner

MICROPOROUS MEMBRANE AND METHOD FOR FORMING

CROSS REFERENCE TO RELATED APPLICATIONS

This Application is a Divisional Application of application Ser. No. 13/129,145, filed Oct. 22, 2009, now allowed, which is a national stage filing under 35 U.S.C. 371 of PCT/US2009/061572, filed Oct. 22, 2009, which claims priority to Provisional Application No. 61/116,841, filed Nov. 21, 2008, the disclosure of which is incorporated by reference in its/their entirety herein.

FIELD

The present disclosure relates to a method for forming a microporous membrane.

BACKGROUND

Microporous membranes with diverse properties are used in many modern products, including such things as filters, breathable articles, absorbent articles, and medical articles. There are many known ways to manufacture microporous membranes, including a phase separation in a dope layer. By manipulating the conditions that trigger the phase separation, different morphologies can be generated in the resulting microporous membrane, adapting it to the specific needs of the end user.

One of the ways that a phase separation can be triggered is by contacting a dope formulation with a nonsolvent. Methods of making microporous membranes are further described in U.S. Pat. No. 6,736,971 (Sale et al.); U.S. Pat. No. 5,869,174 (Wang); U.S. Pat. No. 6,632,850 (Hughes et al.); U.S. Pat. No. 4,992,221 (Malon et al.); U.S. Pat. No. 6,596,167 (Ji et al.); U.S. Pat. No. 5,510,421 (Dennis et al.); U.S. Pat. No. 5,476,665 (Dennison et al.); and U.S. Patent Application Publication Nos. 2003/0209485; 2004/0084364 (Kools).

Coagulation of dope layers with coagulation baths has been described. Another known method for coagulating dope layers includes introducing a non solvent to the dope layer in the form of a vapor.

SUMMARY

The present disclosure describes a method for forming a microporous membrane. More specifically, vapor induced phase separation techniques are used for forming multizone microporous membranes having improved material throughput.

In one aspect, a method is provided for forming microporous membranes having two or more zones (e.g., multizone). The membrane is suitable for high material throughput applications. The method includes casting a plurality of dope formulations on a support to provide a multilayer sheet having a first major surface, and exposing the multilayer sheet to a first relative humidity level so that water vapor diffuses into the first major surface. The method includes exposing the multilayer sheet to a second relative humidity level greater than the first relative humidity level so that additional water vapor diffuses into the multilayer sheet effecting a phase separation to provide the microporous membrane. The method also includes washing and drying the microporous membrane.

In one aspect, a multizone microporous membrane comprising a first zone and a second zone is described. The multizone microporous membrane independently comprises pores having average pore diameters, such that the average pore diameters of the first zone are greater than the average pore diameters of the second zone. The multizone microporous membrane has a water flux measurement of at least 3,000 lmh/psi and a forward flow bubble point measurement comprising a first zone pressure peak less than 5 psi and an initial bubble point pressure measurement less than 15 psi.

DETAILED DESCRIPTION

Figure 1:
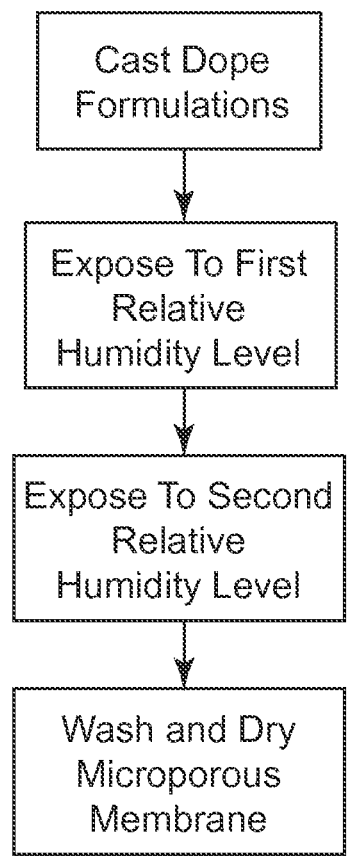
FIG. 1 is a schematic representation of a process for forming a multizone microporous membrane.

Although the present disclosure is herein described in terms of specific embodiments, it will be readily apparent to those skilled in the art that various modifications, rearrangements, and substitutions can be made without departing from the spirit of the invention. The scope of the present invention is thus only limited by the claims appended herein.

The term "dope formulation" refers to a composition comprising polymeric material and an adjuvant in a solvent.

The term "casting" refers to die forming and depositing dope formulations in layers to form a multilayered sheet.

The term "relative humidity level" refers to the concentration of water vapor in air and is defined as the ratio of the partial pressure of water vapor in the mixture to the saturated vapor pressure of water at the same temperature. Relative humidity is normally expressed as a percentage.

The term "phase separation" refers to the transformation of a homogenous system (e.g., dope formulation) into two or more phases. Examples of phase separation mechanisms include vapor induced phase separation (VIPS), thermal induced phase separation (TIPS) and liquid-liquid phase separation (LIPS).

The term "adjuvant" refers to an additive(s) for a dope formulation.

The term "multizone microporous membrane" refers to a membrane having at least two distinct porous portions, each of the porous portions referred to as a "zone" or a "microporous zone."

The recitation of numerical ranges by endpoints includes all numbers subsumed within that range (e.g., 1 to 5 includes 1, 1.5, 2, 2.75, 3, 3.8, 4, and 5).

As included in this specification and the appended claims, the singular forms "a", "an", and "the" include plural referents unless the content clearly dictates otherwise. Thus, for example, reference to a composition containing "a compound" includes a mixture of two or more compounds. As used in this specification and appended claims, the term "or" is generally employed in its sense including "and/or" unless the content clearly dictates otherwise.

Unless otherwise indicated, all numbers expressing quantities or ingredients, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present disclosure. At the very least, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains errors necessarily resulting from the standard deviations found in their respective testing measurements.

The present disclosure uses a VIPS process to form microporous membranes. The process includes casting dope formulations on a support to provide a multilayered sheet, and exposing the multilayered sheet to water vapor at two different relative humidity levels. The multilayered sheet is first exposed to water vapor at a first relative humidity level. The water vapor diffuses into the multilayered sheet along the first major surface thereof. Not wishing to be bound by theory, exposure to water vapor at a first relative humidity is believed to transform the dope formulations in the multilayered sheet into a metastable state. The multilayered sheet is then exposed to water vapor at a second relative humidity level greater than the first relative humidity level. The water vapor at the second relative humidity level also diffuses into the multilayered sheet to increase the concentration of water therein and induce a phase separation in the dope formulations. Following washing and drying of the water-treated multilayered sheet, each of the original layers of the sheet become distinct microporous zones which are joined to one another along a common interface and which, together, form a multizone microporous membrane.

FIG. 1 is a process flow diagram for forming microporous membranes by the above described method. As shown, dope formulations are first cast on a support to form a multilayered sheet. The multilayered sheet is then exposed to water vapor at a first relative humidity level followed by a second exposure to water vapor at a second relative humidity level. After exposure to the second relative humidity level, the microporous membrane is typically washed and dried to provide a multizone microporous membrane.

Figure 2:
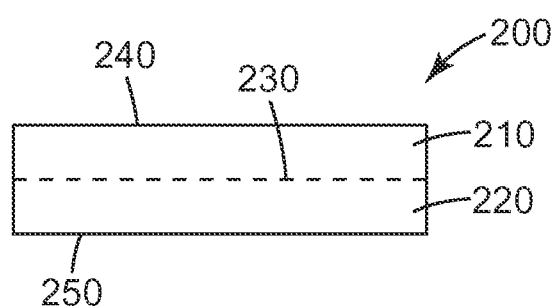
FIG. 2 is schematic representation of a multizone microporous membrane.

FIG. 2 illustrates a multizone microporous membrane 200 according to the present disclosure. Multizone microporous membrane 200 has a first zone 210 and a second zone 220. First zone 210 and second zone 220 are joined to one another along a common interface 230. Both the first zone 210 and the second zone 220 include a plurality of micropores (not shown) formed as a result of the VIPS process. In embodiments of the present disclosure, the first zone 210 includes a pore structure with average pore dimensions that are larger than the average pore dimensions of the pores in the second zone 220. A first major surface 240 of the first zone 210 is located opposite the common interface 230, and a second major surface 250 of the second zone 220 is located opposite the common interface 230 of the multizone microporous membrane 200.

Multizone microporous membranes formed herein are generated without the use of coagulation baths or from the construction of multiple monozone membrane layers. The elimination of coagulation baths reduces the overall costs previously associated with the formation of microporous membranes by eliminating the need for filtering and cleaning such baths and related equipment. The resulting multizone microporous membranes have a combination of high material throughput, fast water flow and robust hydrophilicity.

In the various embodiments, the dope formulations comprise polymeric material, an adjuvant, solvent and additives for controlling the rate and depth of phase separation throughout the thickness of a multilayer sheet and to influence the formation of a specific microstructure in the final multizone microporous membrane.

The concentration of the polymeric materials and/or the adjuvant of the dope formulations can influence the formation of the final microstructure within each of the zones, facilitate the degree of diffusion of water vapor into the multilayer at first and second relative humidity levels, and influence the integrity of the resulting microporous membrane. Simply stated, if the concentration of the polymeric material of the dope formulation is too low, a membrane will not be formed. Similarly, if the concentration of the polymeric material in a dope formulation is too high, an undesired or irregular microstructure may result.

The concentration of the polymeric material can be selected, in part, to provide a desired viscosity and/or surface tension for the dope formulation in order to facilitate casting of the formulation as a layer in a multilayered sheet. Suitable polymeric materials generally comprise materials capable of forming micropores (e.g., microstructures) upon exposure to water vapor. In some embodiments, dope formulations include polymeric materials having a concentration within the range from about 5 weight percent to about 15 weight percent based on the total weight of the dope formulation. In some embodiments, the concentration of the polymeric material is in a range from about 7 weight percent to about 14 weight percent, or in a range from about 9 weight percent to about 14 weight percent based on the total weight of the dope formulation.

In the manufacture of membranes constructed from at least two different dope formulations, i.e., a first dope formulation and a second dope formulation, the second dope formulation may have a concentration of polymeric material greater than the concentration of polymeric material in the first dope formulation.

A number of polymeric materials are suitable to include in a dope formulation, and suitable dope formulations can comprise a single polymeric material or a blend of polymeric materials. The polymeric materials can be amorphous, crystalline, or partially crystalline. In some embodiments, the polymeric material in a first dope formulation is the same as the polymeric material in a second dope formulation. In other embodiments, the polymeric material in a first dope formulation is different than the polymeric material in a second dope formulation.

Examples of suitable polymeric materials include, for example, polyethersulfones, polyetherimides, polyimides, polyamides, polysulfones, polyarylsulphones, polyvinyl chloride, polyethylene terephthalate, polycarbonates, polyolefins such as polyethylene or polypropylene, cellulose esters such as cellulose acetate or cellulose nitrate, polystyrenes, acrylic polymers, methacrylic polymers, copolymers of acrylic or methacrylic polymers, and combinations thereof.

In some embodiments, the polymeric material of a dope formulation is a polyethersulfone according to Formula (I).

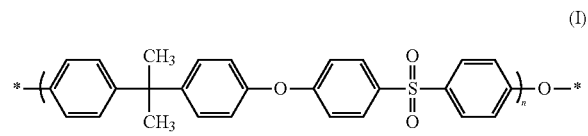

In further embodiments, the polymeric material of a dope formulation is a polyetherimide according to Formula (II).

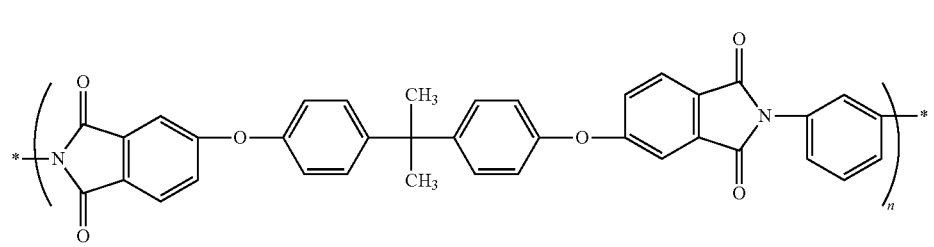

In various embodiments, suitable dope formulations are formulated to have a viscosity that is high enough to permit the formulation to be cast as a layer in a multilayered sheet. A suitable viscosity for a dope formulation may depend on certain process conditions such as the actual or anticipated line speed of a substrate supporting the molten dope formulations following the casting step. Similarly, factors such as surface tension, general bead stability and other fluid properties of the dope formulations are considered for ensuring coating uniformity. The foregoing factors can also affect the diffusion of water vapor into a dope formulation layer according to the VIPS process utilized herein.

In some embodiments, an appropriate viscosity for a dope formulation is within the range from about 2,000 centipoises to about 8,000 centipoises. In some embodiments, the viscosity of the dope formulation is in a range from about 2,000 centipoises to about 7,000 centipoises, or in a range from about 3,000 centipoises to about 6,500 centipoises.

The dope formulations herein include at least one solvent. Suitable solvents are those that dissolve the polymeric material to provide a homogeneous solution. In various embodiments, the solvent is compatible with the polymeric material, adjuvant and any optional additives present in the dope formulation. The selection of a solvent can be made by one skilled in the art to influence one or more steps in the VIPS process as well as the properties of the resulting microporous membrane. For example, the selection of a solvent can influence the rate of phase separation for the multilayered sheet, the type of microstructure formed in the finished membrane, or the depth of the microstructure formation within a layer of the dope formulation. Examples of solvents for dope formulations useful in the present disclosure include, for example, water, dimethyl formamide (DMF), N,N-dimethylacetamide, N-methyl-2-pyrrolidinone (NMP), tetramethylurea, acetone, methyl ethyl ketone (MEK), methyl acetate, ethylacetate and other alkyl acetates, dimethylsulfoxide (DMSO), and combinations thereof. In some embodiments using a polyethersulfone polymer, the solvent is N-methyl-2-pyrrolidinone. A solvent can be oligomeric or polymeric in nature. In some embodiments, the dope formulation can comprise more than one solvent, or a blend of solvents.

The solvent provides a stable homogeneous solution for casting a dope formulation to form a microporous membrane. Solvents are categorized as 'good' solvents, 'nonsolvents', and 'poor' solvents, depending on their ability to dissolve the selected polymer therein. Solvents categorized as 'good' are those in which the interactions (forces of attraction) between the polymer molecules and solvent molecules are greater than the forces of attraction between polymer molecules. The reverse is true for nonsolvents. Solvents described as 'poor' are those in which the interactions between the polymer and solvent are equal to the forces of attraction between polymer molecules.

In one embodiment, a stable homogeneous dope formulation can be obtained by first dissolving the chosen polymer in a good solvent. For dope formulations having a polymeric material in the form of a polyethersulfone, suitable 'good' solvents include, for example, N-methyl-2-pyrrolidinone, dimethylacetamide, dioxane, dimethylsulfoxide, chloroform, tetramethylurea, and tetrachloroethane. In general, good solvents are able to dissolve substantial amounts of polymeric material. In some embodiments, a 'good' solvent is one that is miscible with the polymeric material at polymer concentrations of at least about 5 weight percent based on the total weight of the dope formulation.

One useful method for evaluating solvents for compatibility with a polymer is by the use of Hildebrand solubility parameters. These parameters refer to a solubility parameter represented by the square root of the cohesive energy density of a material, having units of $(pressure)^{1/2}$, and being equal to $$(\Delta H-RT)^{1/2}V^{1/2}$$

where
$\Delta H$ is the molar vaporization enthalpy of the material,
R is the universal gas constant,
T is the absolute temperature, and
V is the molar volume of the solvent.

Hildebrand solubility parameters are tabulated for solvents in: Barton, A. F. M., "Handbook of Solubility and Other Cohesion Parameters", $2^{nd}$ Ed., CRC Press, Boca Raton, Fla. (1991); for monomers and representative polymers in "Polymer Handbook", $4^{th}$ Ed., J. Brandrup & E. H. Immergut, Eds. John Wiley, NY, pp. VII 675-714 (1999); and for many commercially available polymers in Barton, A. F. M., "Handbook of *Polymer-Liquid* Interaction Parameters and Solubility Parameters", CRC Press, Boca Raton, Fla. (1990).

Adjuvants selected for the dope formulations are generally soluble in the solvent and are compatible with the polymeric material. Adjuvants can be added to dope formulations to adjust the viscosity of a dope formulation prior to casting it as a layer in a multilayer sheet. Similarly, the concentration of adjuvant in a dope formulation can influence the diffusion of water vapor into layers of dope formulations during the VIPS process. Adjuvants can also be added to dope formulations to control the rate (kinetics) of the phase separation in a VIPS process. Some useful adjuvants include, for example, poly (alkylene) glycols, polyethers, or combinations thereof. In some embodiments, the adjuvant is poly(ethylene) glycol.

Adjuvants added to dope formulations at selected concentrations can effect phase separation at a predetermined depth within a layer of a dope formulation. In some embodiments, the depth of the phase separation within a layer of dope formulation is in a range from about 5 percent to about 100 percent of the thickness of the layer.

In some embodiments, the concentrations of adjuvant(s) in a plurality of dope formulations are selected to influence phase separation and provide different pore size distributions and different porosities for each of the different zones within the multizone microporous membrane. Multizone microporous membranes having zones with different average pore diameters are useful in certain high material throughput and high flux filtration applications.

In some embodiments, the adjuvant concentration in a dope formulation can be in a range from about 60 weight percent to 70 weight percent based on the total weight of the dope formulation. In some embodiments, the concentration of the adjuvant is in a range from about 60 weight percent to about 68 weight percent, or in a range from about 62 weight percent to about 68 weight percent based on the total weight of the dope formulation.

In the manufacture of multizone microporous membranes using a VIPS process, the dope formulations are first cast on a support to provide a multilayer sheet. The support can be a plastic or a metal sheet, and it can be continuous or discontinuous (e.g., discrete). The selected support provides stability for the stacked layers of dope formulations while casting and during transport through the first and second humidified environments, and during the washing and drying steps.

A plurality of dope formulations is typically cast to form a multilayered sheet on a support. In this configuration, a first dope formulation layer is stacked onto a second dope formulation layer with an interface formed between the layers. The second dope formulation layer lays directly on the support and the first dope formulation layer is positioned on top of the second dope formulation, opposite the support. The resulting multilayered sheet has a first major surface that coincides with the exposed surface on the first dope formulation layer.

In some embodiments, two dope formulation layers are cast simultaneously to provide the aforementioned configuration. Simultaneous casting of multiple dope formulations can be accomplished using any of a number of known techniques and devices. Some useful devices include a multipath applicator, a dual-knife over roll device, a dual layer slot fed knife die, and other related devices known in the art for casting dope formulations.

The thickness of any dope formulation layer is dependent on several variables, as known by those skilled in the art. For example, the thickness of a layer can depend on the equipment settings as well as on the rheology and viscosity of the respective dope formulations. Additionally, the foregoing methods for casting typically involve the use of a die to shape the dope formulations as they are cast into a multilayered sheet. Consequently, the thicknesses of the dope formulation layers are directly affected by the gap dimensions of the particular die slots that are used for the casting operation. Moreover, gap dimensions may be adjusted, in part, to accommodate the viscosity of a dope formulation. In casting dope formulations using a dual knife over roll device, the gap dimensions can be in a range from about 150 micrometers to about 300 micrometers.

After casting the dope formulation layers to form the multilayer sheet, the multilayer sheet is exposed to at least two humidified environments to induce phase separation and the formation of microstructures within the layered dope formulation layers.

The design of dope formulations that are suitable for forming microporous membranes is better understood through a consideration of principles of polymer solubility, the miscibility of components, and the concentrations of polymer, solvent, and water. At certain concentrations, polymeric material is completely miscible with solvent. At other concentrations, a region of phase separation exists.

Figure 3:
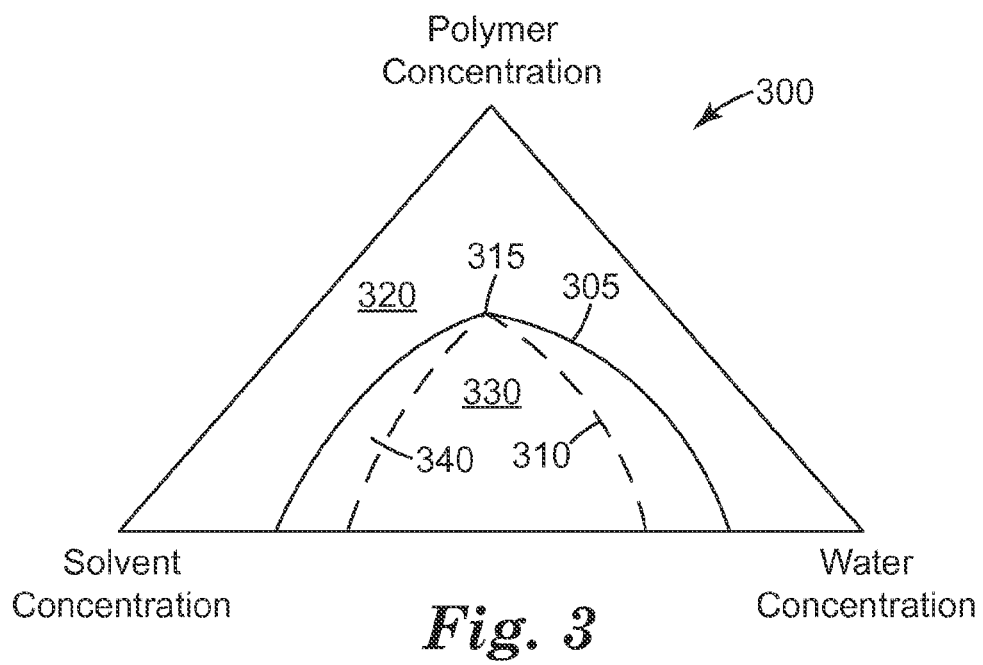
FIG. 3 is a schematic representation of a ternary phase diagram.

Referring to FIG. 3, a ternary phase diagram 300 is shown for the components of an exemplary dope formulation, i.e., polymer concentration, water concentration and solvent concentration. FIG. 3 illustrates a relationship between the three components. In the diagram 300, binodal curve 305 delineates the regions 320 and 330. Each region represents areas of component concentrations for a dope formulation, with region 320 representing a thermodynamically stable concentration of components and region 330 representing a thermodynamically unstable concentration of components. Accordingly, the relationship of the polymer concentration to solvent and water concentrations is delineated by the binodal curve 305. Region 330 is further divided to include area 340 between spinodal curve 310 and binodal curve 305. Spinodal curve 310 and binodal curve 305 intersect at point 315 which represents the so-called theta condition (Θ). Not wishing to be bound by theory, at Θ, the interaction forces between the polymeric material molecules and the solvent molecules equal the interaction forces of polymer molecules for other molecules of the same polymer. A dope formulation having component concentrations within area 340 represents a composition believed to be in a metastable state prior to phase separation. A dope formulation having component concentrations within area 330 but outside of area 340 represents a phase separated composition.

In the processing of a dope formulation via a VIPS process, the formulation is exposed to water vapor to increase the water content of the formulation and thereby alter the concentrations of solvent and polymer. The VIPS process seeks to induce a phase separation of a homogeneous solution by adding water (e.g., as water vapor) to the dope formulation and altering the component concentrations of the formulation until the component concentrations migrate from region 320, where the formulation is thermodynamically stable (e.g., a solution), to region 340 where it is believed to exist in a metastable state. With at least one additional exposure to water vapor at a second relative humidity level, a sufficient amount of water vapor will be diffused into the dope formulation so that the component concentrations of the formulation move it out of region 340 and further into the region 330 where phase separation occurs.

Humidified environments (i.e., chambers or stations) may be used for delivering water vapor to the dope formulations of a multilayered sheet. For example, water vapor can be delivered by injecting steam into humidified chambers. Sensors placed within the chambers can be used to monitor the actual air temperature and percent relative humidity (e.g., relative humidity level). Exposure times to water vapor can vary within a useful range depending on factors such as the relative humidity levels being employed, air temperature, and gas phase (e.g., steam) velocity. In various embodiments, the exposure time for the multilayered sheet can be, for example, in a range from about 7.5 minutes to about 25 minutes. In some embodiments, exposure time can be, for example, in a range from about 10 minutes to about 22.5 minutes, in a range from about 10 minutes to about 20 minutes, or in a range from about 12.5 minutes to about 20 minutes.

In delivering water vapor to dope formulations comprised of the polymers and solvents described herein, the first relative humidity level can be in a range from about 45 percent to about 55 percent. In some embodiments, the first relative humidity level can be in a range from about 46 percent to about 54 percent, in a range from about 46 percent to about 53 percent, or in a range from about 46 percent to about 52 percent. After exposure to water vapor at a first humidity level for a period of time, the multilayered sheet is exposed to a second relative humidity level to induce a phase separation. The second relative humidity level is at least 5 percent greater than the first relative humidity level. In some embodiments, the second relative humidity level is at least 6 percent greater, at least 7 percent greater, at least 8 percent greater, at least 9 percent greater, or at least 10 percent greater than the first relative humidity level. The second relative humidity level can be in a range from about 60 percent to about 80 percent. In some embodiments, the second relative humidity level is in a range from about 60 percent to about 75 percent, in a range from about 62 percent to about 75 percent, or in a range from about 65 percent to about 75 percent.

In some embodiments, dope formulations in a multilayered sheet are exposed to water at a relative humidity level intermediate to the first relative humidity level and to the second relative humidity level. The intermediate relative humidity level may be desired for certain dope formulation or under certain processing conditions in order to gradually increase the water content of the dope formulations. In one embodiment, the first relative humidity level can be in a range from about 45 percent to 50 percent, the intermediate relative humidity level (e.g., intermediate) can be in a range from about 50 percent to 55 percent, and the second relative humidity level can be in a range from about 55 percent to 65 percent.

Humidified environments used for the delivery of water vapor and the aforementioned relative humidity levels are typically maintained within a desired temperature range between about 15° C. to about 55° C. In some embodiments, the temperature can be, for example, between about 20° C. to about 50° C., between about 20° C. to about 47° C., or between about 20° C. to about 45° C.

Following exposure to water vapor, the resulting phase separated microporous membrane is subjected to washing and drying processes. Washing of the microporous membrane aids in removal of solvents, including water, used in the dope formulations. The washing step described helps to prevent the microstructure of the membrane from collapsing. Washing can be accomplished by spraying, immersing, and other techniques for removing solvents and water. In one embodiment, the membrane is moved through a tank with fluid bearing rollers. After washing, the microporous membrane can be dried by convection, air drying and vacuum processing. In some embodiments, the membrane is dried at ambient conditions in air.

Effective pore sizes (e.g., average pore diameters) formed in the multizone microporous membranes can range from about 0.05 micrometer to about 2 micrometers. In some embodiments, the pore dimensions from the microporous membrane can be, for example, in a range of about 0.1 micrometer to about 1.5 micrometers, or in a range of about 0.2 micrometer to about 0.8 micrometer. In some embodiments, the pore dimensions of the microporous membrane can be nearly uniform or symmetrical through a thickness of one or more of the zones. Zones can have a symmetrical distribution of pores extending through a portion of the thickness of the zone or through the entire thickness of the zone. In some embodiments, multizone microporous membranes formed by the method described comprise at least two zones having nearly symmetrical pore distributions extending through the thicknesses of their respective zones.

Pore size of the membranes refers to the average diameter of an opening within a microstructure formed during phase separation. Pore sizes can be measured, for example, by bubble point pressure methods. Some other pore size and pore size distribution measurement methods can include, for example, solute retention, and flow/pressure techniques. Pore diameter can also be estimated by porometry analysis and by a separate measurement of the bubble point, with a higher bubble point indicative of tighter or smaller pores.

Multizone microporous membranes can be formed comprising at least two zones having different pore dimensions within each of their respective zones.

Microporous membranes formed by the method described herein provide for multizone microporous membranes having a first zone and a second zone. Pores of the first zone provide a first microstructure having larger pore dimensions than the pores formed in the second zone providing a second microstructure The microstructures formed can depend on the dope formulation and the processing parameters. The first and second microstructures can provide a continuous or discontinuous path through the membrane. The formation of the microstructures can depend on the concentration of some of the components (e.g., polymeric material, coating adjuvant, nonsolvent) of the dope formulation and the water vapor concentration. The morphology (e.g., symmetric or asymmetric) of the microstructures can further depend on the metering (e.g., layer thickness) of the dope formulations, relative humidity level and/or the rate of phase separation. The morphology can also depend on the phase separation mechanism, and related pressure and temperature processing conditions.

In some embodiments, the first zone of the microporous membrane has average pore dimensions which are greater than the average pore dimensions of the second zone. The ratio of the average pore dimensions of the first zone to the second zone can be, for example, in a range of about 10:1 to about 2:1.

Thickness of the microporous membranes formed can be dependent on the thickness of the dope formulation layers when cast, and subsequent removal of solvents followed by the steps of washing and drying the microporous membrane. In some embodiments, the thickness of the microporous membrane can be, for example, in a range of about 125 micrometers to about 150 micrometers. In some embodiments, the thickness of the microporous membrane can be in a range of about 125 micrometers to about 145 micrometers, in a range of about 125 micrometers to about 140 micrometers, or in a range of about 125 micrometers to about 135 micrometers.

In one embodiment, the thickness of the first zone is greater than the thickness of the second zone of the multizone microporous membrane. In another embodiment, the thickness of the first zone is equal to the thickness of the second zone of the multizone microporous membrane.

Multizone microporous membranes formed by the method of the present application can be used in filtration applications. For example, the first zone can act as a pre-filter for capturing larger particles and the second zone can capture smaller particles.

Multizone microporous membranes comprising a first zone and a second zone comprise pores having average pore diameters. The average pore diameters of the first zone are generally greater than the average pore diameters of the second zone.

In one aspect, the multizone microporous membrane formed herein has a water flux measurement of at least 3,000 lmh/psi and a forward flow bubble point measurement comprising a first zone pressure peak less than 5 psi and an initial bubble point pressure measurement less than 15 psi.

In some embodiments, a combination microporous membrane can be formed comprising a multizone microporous membrane, as already described, laminated to a monozone microporous membrane. As used herein, the term "monozone microporous membrane" refers to a microporous membrane having at least one porous zone resulting from the vapor induced phase separation of a single dope formulation. In some embodiments, a monozone membrane can have two or more layers, but the resulting membrane zones will have average pore diameters that are substantially the same. Such a monozone membrane is made in the same manner as described herein for multizone microporous membranes but using first and second dope formulations that are identical or at least are substantially the same. While the monozone membrane includes two 'zones,' both zones are of the same morphology and average pore size and, consequently form a single filtration zone.

Lamination of the multizone microporous membrane and the monozone microporous membrane can be accomplished using known lamination techniques including pressure or thermal methods and/or using a suitable additive or an adhesive. The resulting article is referred to as a combination microporous membrane comprised of a multilayered microporous membrane having a monozone membrane affixed (e.g., laminated) to the major surface of the second zone.

Multizone membranes formed herein eliminate the need for combination membranes formed by lamination of at least two membranes. Microporous membranes formed by the described methods can reduce manufacturing costs and increases manufacturing efficiency. The use of humidified environments to deliver water vapor to sheets for inducing phase separation in multilayer sheets eliminates the need for a coagulation bath and multiple washing steps.

The multizone microporous membranes disclosed herein have high material throughput. The multizone microporous membranes can be used in pharmaceutical, biological, medical, food and beverage applications. A filter assembly comprising a cartridge, an inlet, an outlet, and a multizone microporous membrane residing in the cartridge can be used in residential, commercial and industrial applications.

The disclosure will be further clarified by the following non-limiting examples.

EXAMPLES

Unless otherwise noted, all parts, percentages, and ratios reported in the following examples are on a weight basis, and all reagents used in the examples were obtained, or are available, from the chemical suppliers described below, or can be synthesized by conventional techniques.

Initial Bubble Point Pressure (IBP)

ASTM Standard E-128-99 (2005). IBP measurements were recorded on 47 mm diameter pre-wetted microporous membranes with fluorochemical FC-43 (Sigma-Aldrich, St. Louis, Mo.).

Water Flow Rate (WFR)

WFR measurements were recorded on the microporous membranes. The membranes were pre-wetted with isopropanol and deionized water. The length of time required for 100 ml of deionized water to pass through the microporous membrane under reduced pressure (59 cm Hg) was recorded. The WRF method is further described in U.S. Pat. Nos. 7,125,603 and 6,878,419 (Mekela et al.), herein incorporated by reference.

Robust Molasses Throughput (RMT)

RMT measurements were recorded on a multistation stand (e.g. multiple sample station for running several experiments concurrently under identical process conditions) with a 0.1 wt. % molasses solution (B&G Foods, Incorporated; Parsippany, N.J.). The molasses solution was pumped at a constant volumetric flow rate of 48 ml/minute through 47 mm diameter microporous membrane disks. The microporous membranes were pre-wetted with a solution blend of 60 wt. % isopropanol/40 wt. % deionized water. The cumulative volume (ml) of the filtrate was taken when the trans-membrane pressure of 25 psi (pounds per square inch) was achieved.

Forward Flow Bubble Point (FFBP)

FFBP measurements were recorded using 47 mm diameter membranes pre-wetted with an isopropanol/deionized water (60/40 vol./vol.) mixture. For the multizone microporous membranes, a first zone pressure peak and an initial bubble point pressure measurement were recorded. FFBP measurements are similarly described in U.S. Pat. No. 4,341,480 (Pall et al.), U.S. Pat. No. 6,413,070 (Meyering et al.), and U.S. Pat. No. 6,994,789 (Sale et al.).

Comparative Examples 1-2

CE1 and CE 2

Commercial two layer membranes having gradient morphologies were investigated: CE1—Sterile High Capacity (SHC) (Millipore, Billerica, Mass.), and CE2—DuraPES TM-600 (Membrana, Wuppertal, Germany).

Example 1

Dope formulations were prepared and delivered to a dual-knife over roll device. The first dope formulation (first dope) comprised 9.7 wt. % polyethersulfone (Radel H-2000P; Solvay, Alpharetta, Ga.) dissolved in a solution blend (27.3/63 wt. %) of 1-methyl-2-pyrrolidinone (NMP) (Sigma-Aldrich, St. Louis, Mo.)/polyethylene glycol (PEG-400, (Sigma-Aldrich, St. Louis, Mo.)). The second dope formulation (e.g., second dope) comprised 14 wt. % polyethersulfone (Sigma-Aldrich, St. Louis, Mo.) dissolved in a solution blend (17/69 wt. %) of 1-methyl-2-pyrrolidinone (NMP)/polyethylene glycol (PEG-400).

The first and second dope formulations were co-cast onto a 125 micrometer thick polyethylene terephthalate (PET) film (3M Company, St. Paul, Minn.) conveyed at a line speed of 0.41 meters (m)/minute. The gap dimensions of the dual knife over roll device were set at 150 micrometers for the second dope formulation and the gap dimension was set at 225 micrometers for the first dope formulation. The viscosities of the first dope formulation and the second dope formulation were 3,000 centipoises (cps) and 7,500 cps, respectively. The first dope and the second dope formulations were cast as layers on one another forming an interface between the two formulations to provide the multilayer sheet.

The multilayer sheet was introduced into a 7.31 meter long air-floatation dryer line having first and second humidified environmental chambers, and a washing and drying section. Each of the first and second humidified environmental chambers had a length of approximately 2.45 m. Steam was injected into the chambers to achieve the first and second relative humidity levels. The relative humidity of the humidified chambers was controlled by needle valves placed downstream of the steam injectors. Humidity sensors were used to monitor the actual temperature and percent relative humidity in the chambers. The multilayer sheet was exposed to a first relative humidity level of 56 percent at 45° C. in a first humidified chamber for water vapor to diffuse into the first major surface. The multilayer sheet was then exposed to a second relative humidity level of 65 percent at 43.3° C. in a second humidified chamber to effect a phase separation. The resulting article was washed and dried to provide a multizone microporous membrane.

Figure 4:
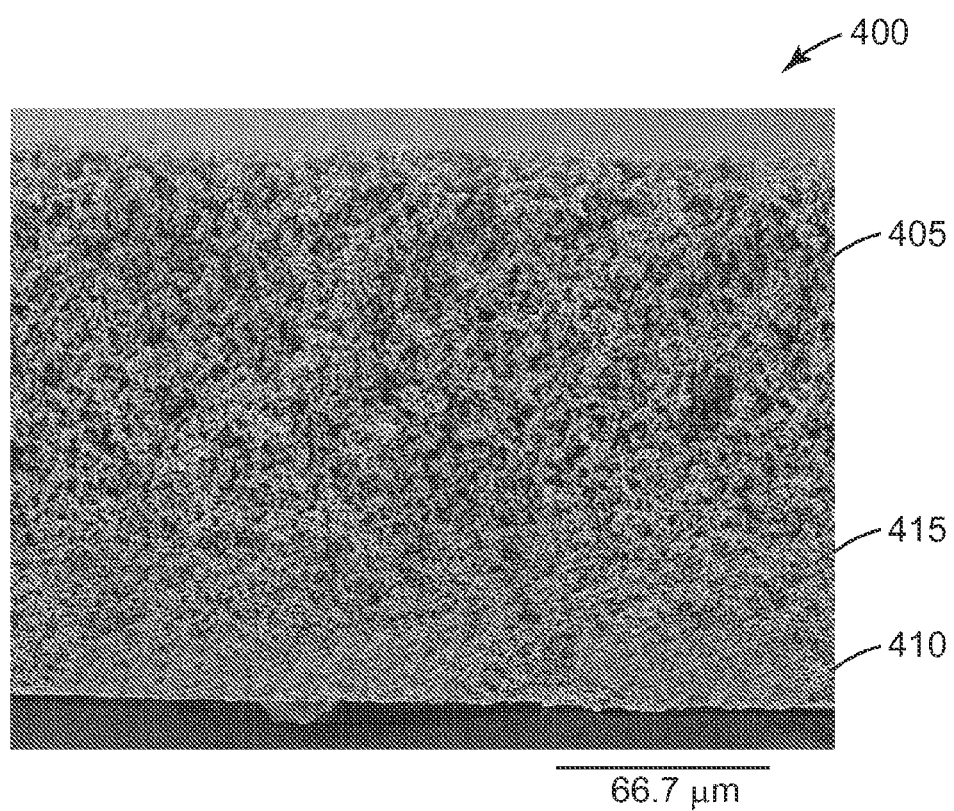
FIG. 4 is a SEM micrograph (cross-section) of a multizone microporous membrane of Example 1 having a first zone and a second zone.

FIG. 4 is an SEM micrograph illustrating, in cross-section, the microporous structure of the multizone microporous membrane 400 according to Example 1. The multizone microporous membrane 400 includes two individual zones having two distinct pore sizes. The first zone 405 has pore sizes of about 0.6 micrometers, and the second zone 410 has pore sizes of about 0.2 micrometers separated by an interface 415. First zone 405 of the multizone microporous membrane 400 can provide a prefiltering membrane feature and the second zone 410 can provide a sterilizing membrane feature in high throughput filtering applications, for example.

Figure 5A:
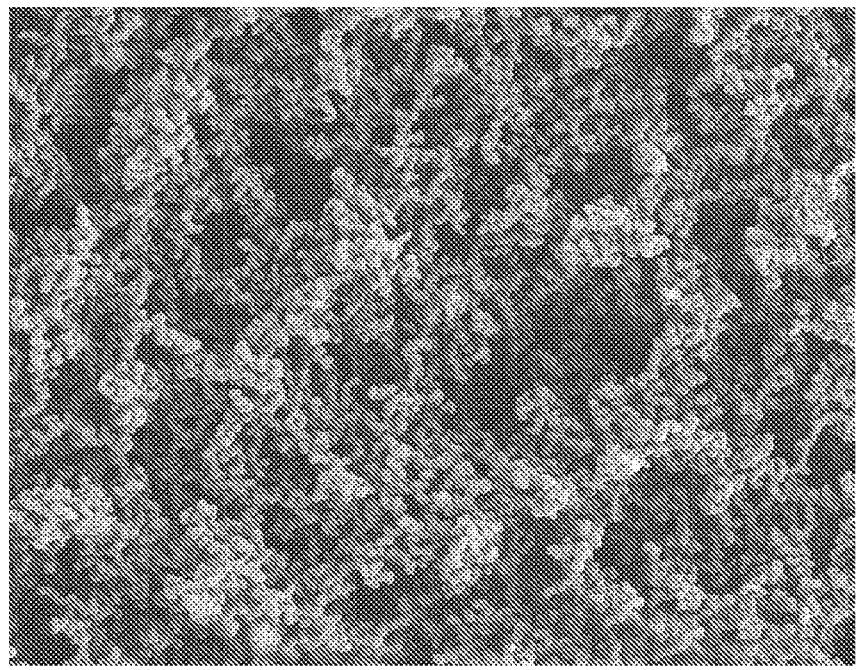
FIG. 5a is a SEM micrograph (planar view) of a first major surface of the first zone of the multizone microporous membrane of FIG. 4.
Figure 5B:
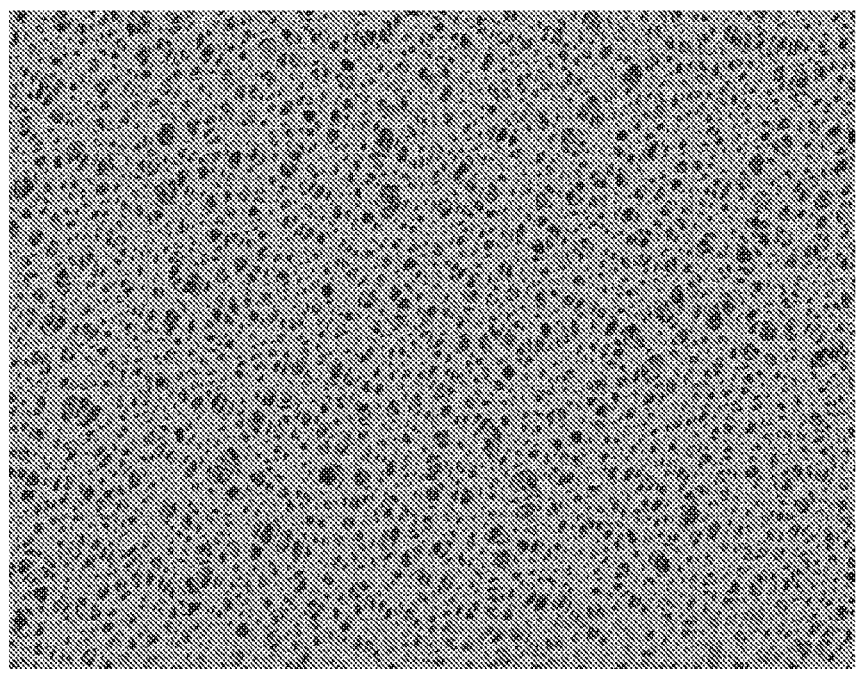
FIG. 5b is a SEM micrograph (planar view) of a second major surface of the second zone of the multizone microporous membrane of FIG. 4.

FIG. 5a is an SEM micrograph (planar view) illustrating a first major surface of the first zone 405 of FIG. 4. FIG. 5b is a SEM micrograph (planar view) illustrating the second major surface of the second zone 410 of FIG. 4.

Figure 6:
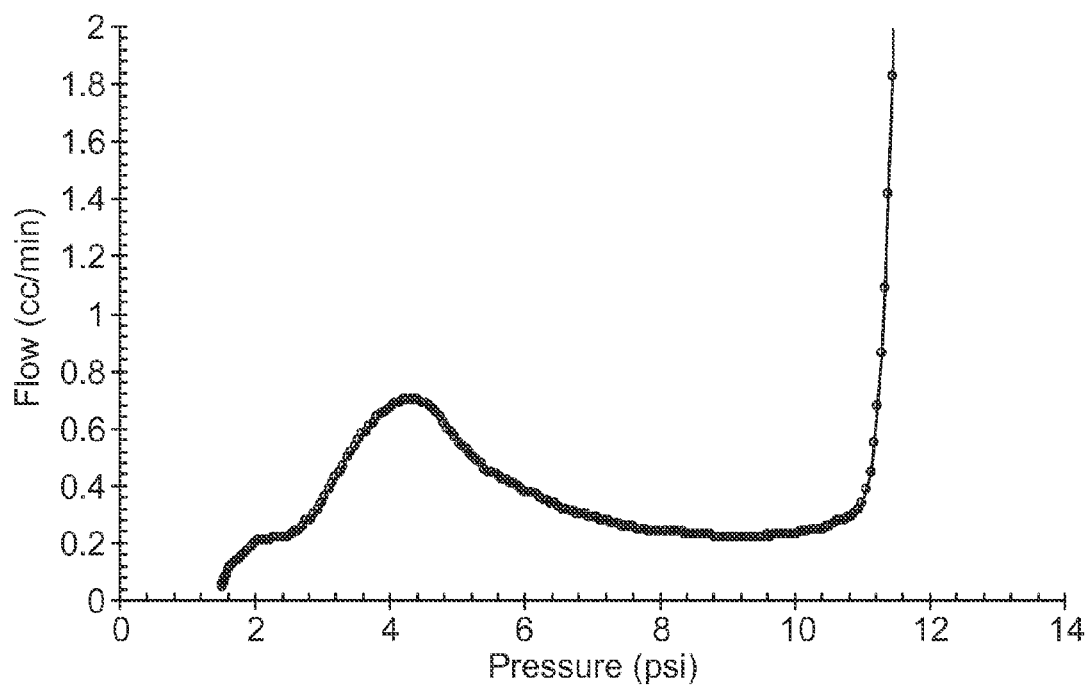
FIG. 6 is a graphical illustration of a Forward Flow Bubble Point graph of a multizone microporous membrane (FIG. 4) of Example 1.

A FFBP curve for Example 1 is illustrated in FIG. 6. The curve supports a multizone morphology having a first zone and a second zone. In FIG. 6, a first zone pressure peak is exhibited at about 4 psi when nitrogen clears the first zone. The bulk flow at about 11.34 psi indicates that adequate nitrogen pressure was reached to clear the second zone of the multizone microporous membrane. Test results from Example 1 are shown in Table 1.

Example 2

A multizone microporous membrane was formed in a manner similar to Example 1 with the following exceptions: polyethersulfone polymer (Ultrson E-6020; BASF, location) was used for the first and the second dope formulations; the first humidity level was 50 percent at 45° C. and the second humidity level was 65 percent at 43° C. The resulting FFBP profile (not shown) supported a multizone morphology having a first zone pressure peak of 4.5 psi. Test results from Example 2 are illustrated in Table 1.

Example 3

A multizone microporous membrane was formed in a manner similar to Example 1 with the following exceptions: the gap dimension of the dual knife over roll device for delivering the first dope layer was set at 350 micrometers; the gap dimension for delivering the second dope layer was set at 125 micrometers; the first relative humidity level was 48 percent at 47.2° C.; the second relative humidity level was 70 percent at 45.6° C. The resulting FFBP profile (not shown) supported a multizone morphology having a first zone pressure peak of 4.5 psi. Test results from Example 3 are illustrated in Table 1.

Example 4

A single-layer monozone microporous membrane (sterilizing-grade membrane) was prepared for use in the construction of a combination membrane. The monozone microporous membrane was formed using the dual knife over roll device of Example 1. The second dope formulation of Example 2 was cast and exposed to a first relative humidity level of 43 percent and 45° C. The single dope formulation layer was then exposed to a second relative humidity level of 65 percent and 43.3° C. The resulting material was washed and dried.

Figure 7:
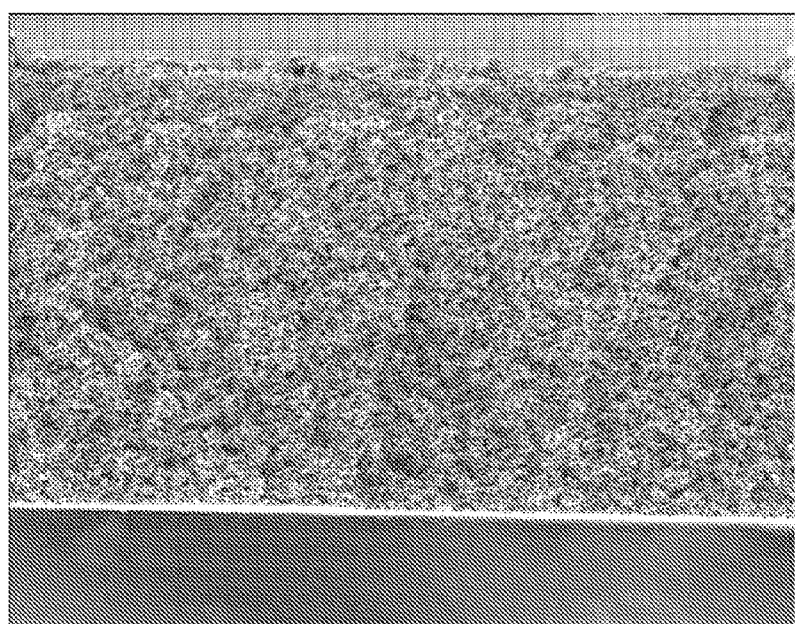
FIG. 7 is a SEM micrograph (cross-section) of a monozone microporous membrane of Example 4.

FIG. 7 is an SEM micrograph of a cross-section of the monozone microporous membrane, showing a symmetrical morphology through the entire thickness of the monozone microporous membrane.

Figure 8:
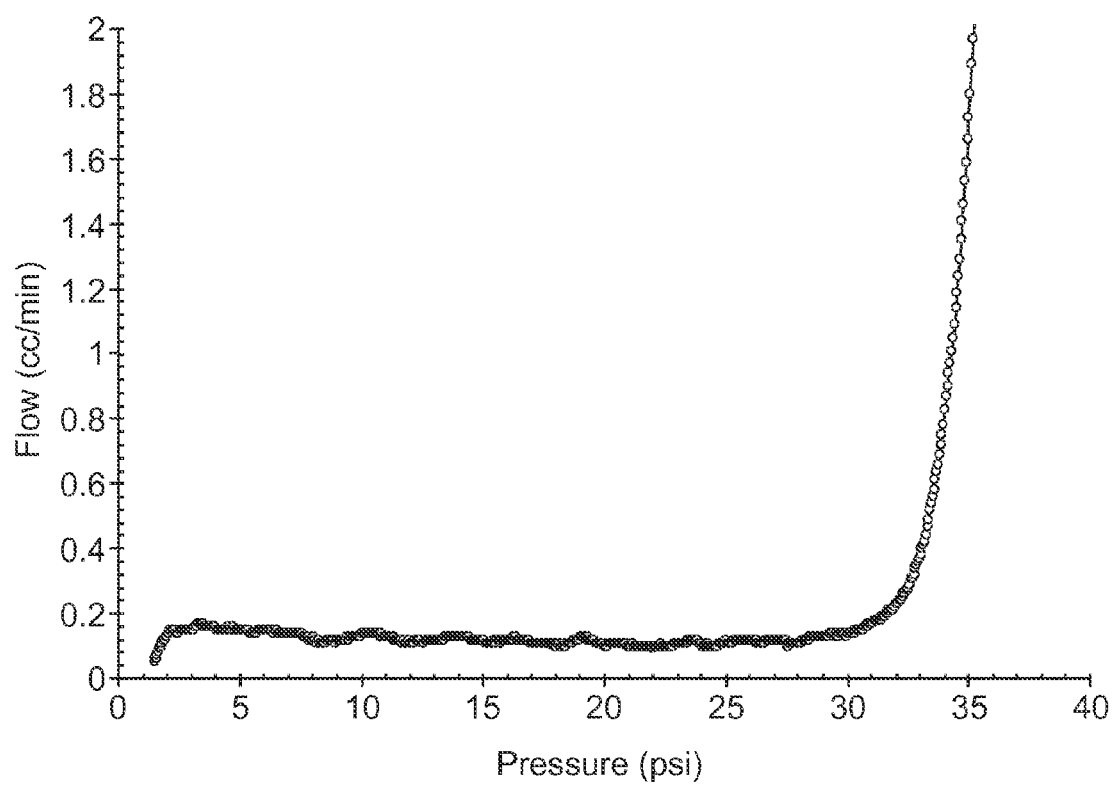
FIG. 8 is a graphical illustration of a Forward Flow Bubble Point graph of a monozone microporous membrane (FIG. 7) of Example 4.

A FFBP curve for Example 4 is illustrated in FIG. 8. The curve supports a monozone morphology. In FIG. 8, nitrogen (g) clears the single zone at a peak of about 35 psi. The monozone microporous membrane was tested, and the results are illustrated in Table 1.

Monozone microporous membranes of FIG. 7 can be applied (e.g., laminated) to multizone microporous membranes for forming combination microporous membranes. The combination microporous membrane can have the monozone membrane (first layer) as a sterilizing membrane and a multizone microporous membrane (second layer) functioning as a pre-filtering membrane.

TABLE 1

| Sample | *RMT (ml) | Turbidity Reduction (%) | Water Flux (lmh/psi) | IBP (psi) |
|---|---|---|---|---|
| 1 | 2969 | 0.55 | 3450 | 11.34 |
| 2 | 2950 | 0.65 | 5036 | 12.4 |
| 3 | 4000 | 0.35 | 7456 | 7.7 |
| CE 1 | 1500 | 0.74 | 2500 | 12.5 |
| CE 2 | 2500 | 0.74 | 2500 | 21 |
| 4 | 100–300 | 0.9 | N/A | 35 |

*Robust Molasses Throughput

Various modifications and alterations of this disclosure will be apparent to those skilled in the art without departing from the scope and spirit of this disclosure, and it should be understood that this disclosure is not limited to the illustrative elements set forth herein.

What is claimed is:

1. A multizone microporous membrane comprising a first zone and a second zone independently comprising pores having average pore diameters, such that the average pore diameters of the first zone are greater than the average pore diameters of the second zone, the multizone microporous membrane having a water flux measurement of at least 3,000 lmh/psi and a forward flow bubble point measurement comprising a first zone pressure peak less than 5 psi and an initial bubble point pressure measurement less than 15 psi.

2. The multizone microporous membrane of claim 1, wherein the first zone has a first thickness and the second zone has a second thickness, the first thickness being greater than the second thickness.

3. The multizone microporous membrane of claim 1, wherein the first zone has average pore diameters in a range from about 0.5 micrometers to about 0.7 micrometers, and the second zone has average pore diameters in a range from about 0.1 micrometers to about 0.3 micrometers.

4. The multizone microporous membrane of claim 1, wherein the first zone and the second zone independently have a symmetrical morphology.

5. The multizone microporous membrane of claim 1, wherein the first zone comprises a polymeric material selected from the group consisting of polyethersulfones, polyetherimides, nylons, polyimides, polyamides, polysulfones, polyarylsulphones, polyvinyl chloride, polyalkylene terephthalates, polycarbonates, polyolefins, cellulosics, polystyrenes, acrylic polymers, methacrylic polymers, copolymers of acrylic or methacrylic polymers, and combinations thereof.

6. The multizone microporous membrane of claim 1, wherein the second zone comprises a polymeric material selected from the group consisting of polyethersulfones, polyetherimides, nylons, polyimides, polyamides, polysulfones, polyarylsulphones, polyvinyl chloride, polyalkylene terephthalates, polycarbonates, polyolefins, cellulosics, polystyrenes, acrylic polymers, methacrylic polymers, copolymers of acrylic or methacrylic polymers, and combinations thereof.

7. The multizone microporous membrane of claim 1, wherein the first zone and the second zone comprise the same polymeric material.

8. The multizone microporous membrane of claim 1, wherein the first zone comprises a polyethersulfone according to Formula (I):

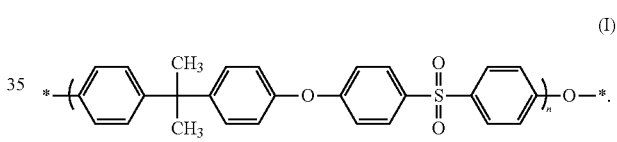

9. The multizone microporous membrane of claim 1, wherein the first zone comprises a polyetherimide according to Formula (II):

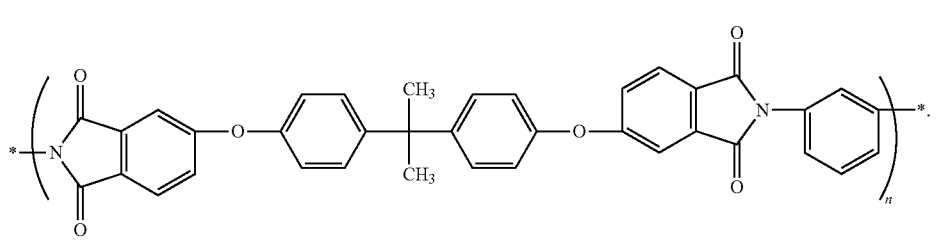

10. The multizone microporous membrane of claim 1, wherein the ratio of the average pore diameters of the first zone to the second zone are in a range of about 10:1 to about 2:1.

11. A combination microporous membrane comprising the multizone microporous membrane of claim 1 laminated to a monozone microporous membrane, the monozone microporous membrane laminated adjacent to the second zone, wherein the average pore diameters of the monozone microporous membrane are smaller than the average pore diameters of the second zone.

12. A filter assembly comprising a cartridge having an inlet and an outlet, and the multizone microporous membrane of claim 1 residing within the cartridge.

\* \* \* \* \*

UNITED STATES PATENT AND TRADEMARK OFFICE
CERTIFICATE OF CORRECTION

PATENT NO. : 8,663,372 B2
APPLICATION NO. : 13/974121
DATED : March 4, 2014
INVENTOR(S) : Ilyess Romdhane It is certified that error appears in the above-identified patent and that said Letters Patent is hereby corrected as shown below:

IN THE SPECIFICATION:

Column 5,

Line 10, delete "  "

and insert -- 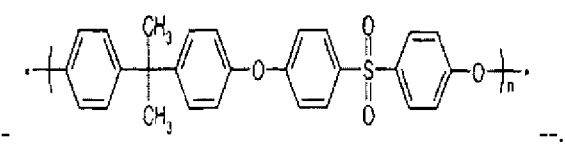 --.

Column 13,
Line 8, delete "CE1" and insert -- CE 1 --.

IN THE CLAIMS:

Column 16,

Line 35, in claim 8, delete " 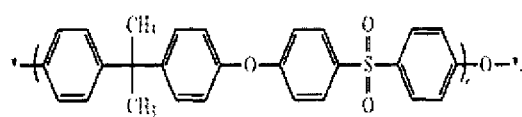 "

and insert -- 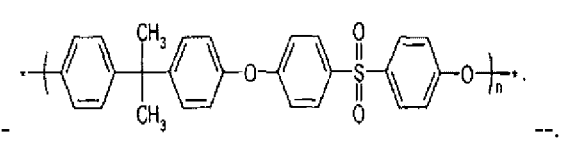 --.

Signed and Sealed this
Eleventh Day of November, 2014

Michelle K. Lee
*Deputy Director of the United States Patent and Trademark Office*